(12) United States Patent
Yang et al.

(10) Patent No.: US 8,478,060 B2
(45) Date of Patent: Jul. 2, 2013

(54) METHOD AND DEVICE FOR COMPRESSING AN IMAGE AND STORAGE MEDIUM CARRYING AN IMAGE COMPRESSED BY SAID METHOD

(75) Inventors: Libo Yang, Beijing (CN); Zhi Bo Chen, Beijing (CN); Xiao Ming Huang, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 263 days.

(21) Appl. No.: 12/735,764

(22) PCT Filed: Feb. 3, 2009

(86) PCT No.: PCT/EP2009/051200
§ 371 (c)(1),
(2), (4) Date: Aug. 16, 2010

(87) PCT Pub. No.: WO2009/103614
PCT Pub. Date: Aug. 27, 2009

(65) Prior Publication Data
US 2010/0310187 A1 Dec. 9, 2010

(30) Foreign Application Priority Data

Feb. 19, 2008 (EP) .................................. 08300102

(51) Int. Cl.
*G06K 9/36* (2006.01)
(52) U.S. Cl.
USPC ........... 382/248; 382/243; 382/232; 382/234; 382/250; 382/238
(58) Field of Classification Search
USPC ......... 382/240, 248, 251, 232, 243, 234–236, 382/238–239, 247, 250; 375/240.11, 240.18, 375/240.21, 240.24, E7.072, E7.199, E7.201, 375/240.01; 348/395.1, 398.1, 405.1, 408.1, 348/420.1, 399.1, 384.1
See application file for complete search history.

(56) References Cited

U.S. PATENT DOCUMENTS

| 6,778,709 | B1 | 8/2004 | Taubman | |
|---|---|---|---|---|
| 6,895,121 | B2 * | 5/2005 | Joshi et al. | 382/243 |
| 7,912,324 | B2 * | 3/2011 | Suino et al. | 382/302 |
| 2003/0044078 | A1 * | 3/2003 | Joshi et al. | 382/243 |

FOREIGN PATENT DOCUMENTS

EP 1274250 1/2003

OTHER PUBLICATIONS

Yang et al., "Region-of-Interest Image Coding Based on EBCOT", IEE Proceedings: Vision, Image and Signal Processing, vol. 152, No. 5, Oct. 7, 2005, pp. 590-596.
Nguyen et al., "Importance Prioritisation in JPEG 2000 for Improved Interpretability", Signal Processing: Image Communication, vol. 19, No. 10, Amsterdam, Netherlands, Nov. 1, 2004, pp. 1005-1028.
Xie et al, "ROI Coding with Separated Code Block", Proceedings of the Fourth International Conference on Machine Learning and Cybernetcis, vol. 9, Guangzhou, China, Aug. 18-21, 2005, pp. 5447-5451.
Search Report Dated Jul. 13, 2009.

* cited by examiner

*Primary Examiner* — Mekonen Bekele
(74) *Attorney, Agent, or Firm* — Robert D. Shedd; Brian J. Dorini

(57) ABSTRACT

The invention is related to a method for compressing images. The proposed method comprises associating perceptual importance parameters with pixels of the image, applying a transform on the image, partitioning the transformed image into code blocks and encoding coefficient bits of a given code block together from a most significant bit plane towards a least significant bit plane, wherein encoding of at least one coefficient is truncated at a truncation bit plane depending on the perceptual importance parameter associated with the pixel to which said code block coefficient corresponds. Truncating encoding of coefficients in dependency on the perceptual importance of the pixel associated with the coefficient allows for truncating coefficients corresponding to perceptually less important pixels at more significant bit planes. So, the overall perceptual quality of the compressed image is enhanced.

11 Claims, No Drawings

METHOD AND DEVICE FOR COMPRESSING AN IMAGE AND STORAGE MEDIUM CARRYING AN IMAGE COMPRESSED BY SAID METHOD

This application claims the benefit, under 35 U.S.C. §365 of International Application PCT/EP2009/051200, filed Feb. 3, 2009, which was published in accordance with PCT Article 21(2) on Aug. 27, 2009 in English and which claims the benefit of European patent application No. 08300102.4, filed Feb. 19, 2008.

BACKGROUND

The invention is related to the compressing of images. More specifically, the invention is related to the encoding of bits of coefficients of a transform of the image in common, from a most significant bit plane towards a least significant bit plane.

Among the encoding frameworks applying said common encoding of coefficient bits is the encoding standard JPEG2000 proposed by the Joint Photographic Expert Group (JPEG).

Common encoding of coefficient bits allows for truncating encoding at a truncation bit plane in order to meet a target bit rate.

But, such truncation comes along with the introduction of artefacts. Artefacts are impacting on the quality of the image as perceived by a user. The more significant the bit plane of truncation is, the more visible the artefacts are.

There is an ongoing effort for improving the perceived quality of images compressed with a fixed target bit rate.

INVENTION

The invention engages in this effort. It exploits the fact that the perceptibility of the artefacts varies in dependence on the perceptual importance of an image area surrounding the artefact. The human eye is more sensitive to artefacts in skin coloured areas of the image, in low-detailed areas of the image and in areas of the image having a mid-tone of luminance.

Doing so, the method and the device for compressing an image, said method comprising the features of claim 1 and said device comprising the features of claim 13, allow for improving the perceived image quality at a fixed target bit rate.

Said method comprises associating perceptual importance parameters with pixels of the image, applying a transform on the image, partitioning the transformed image into code blocks and encoding coefficient bits of a given code block together from a most significant bit plane towards a least significant bit plane, wherein encoding of at least one coefficient is truncated at a truncation bit plane depending on the perceptual importance parameter associated with one or more pixels to which said coefficient corresponds.

Truncating encoding of coefficients in dependency on the perceptual importance of the pixel associated with the coefficient allows for truncating coefficients corresponding to perceptually less important pixels at more significant bit planes. This frees bit rate for truncation of coefficients corresponding to perceptually more important pixels at less significant bit planes. So, artefacts in perceptually more important areas of the image are reduced or removed. Although artefacts in perceptually less important areas of the image are intensified or newly introduced, these intensified or newly introduced artefacts do impair the perceived image quality less than the artefacts removed from or reduced in the perceptually more important areas. So, the overall perceptual quality of the compressed image is enhanced.

In an embodiment, a code block parameter is determined by averaging the perceptual importance parameter over the pixels to which the given code block's coefficients correspond wherein the truncation bit plane depends on said code block parameter.

Averaging the perceptual importance parameter over the given code block allows for adjusting the truncation bit plane.

In another embodiment, the method further comprises the step of weighting a distortion calculation over said given code block's coefficients by a feature weight associated with said given code block and depending on said code block parameter. In said another embodiment, the method further comprises the step of determining the truncation bit plane based on the further weighted distortion calculation.

The weighted distortion calculation may be additionally weighted by other weights, also.

As weighted distortion calculations are used for optimized truncation in encoding frameworks like JPEG2000, introducing a further weight in said calculations presents a simple and easily applicable integration of the inventive method into said encoding frameworks.

In yet another embodiment, the method further comprises the steps of determining a preliminary truncation bit plane and of partitioning said given code block into sub-blocks wherein the encoding of coefficients comprised in at least one sub-block is truncated at an advanced truncation bit plane and the encoding of a coefficient comprised in at least another sub-block is truncated at a reduced truncation bit plane such that an average truncation bit plane corresponds to said preliminary truncation bit plane.

In even another embodiment, coefficients which are comprised in the same sub-block are associated with the same perceptual importance parameter. Furthermore, the at least one sub-block's coefficients are associated with a perceptual importance parameter indicating more perceptual importance than the code block parameter. And, the at least another sub-block's coefficients are associated with a perceptual importance parameter indicating less perceptual importance than the code block parameter.

Then, an amount of bits allotted for said given code block by determination of a preliminary truncation bit plane could be distributed unevenly over the coefficients of said given code block. That is, perceptually more important coefficients are truncated at the advanced truncation bit plane which is less significant than said preliminary truncation bit plane. And, perceptually less important coefficients are truncated at the reduced truncation bit plane which is more significant than said preliminary truncation bit plane. But, the average truncation bit plane used for encoding of said given block remains constant, i.e. it is said preliminary truncation bit plane.

In yet even another embodiment said feature weight associated with said given code block further depends on an image average perceptual importance parameter and/or a maximum among the code block parameters.

Making the feature weights dependent on an image-related average and/or an image-related maximum enables for unevenly distributing a fixed number of bits available for encoding the image over the code blocks.

In a further embodiment, the method further comprises the step of determining bit plane tuning parameters for the sub-blocks wherein said bit plane tuning parameters depend on the perceptual importance parameter associated with the respective sub-block, the code block parameter and/or a maximum perceptual importance parameter within said given block.

Determining bit plane tuning parameters dependent on a code block-related average and/or a code block-related maximum provides a easily calculable parameter for uneven distribution of a fixed number of bits available for encoding the given code block over the sub-blocks of said given code block.

In a yet further embodiment, the method further comprises determining the quantization parameter offset based on a quantization parameter offset step size and/or based on an indication of the number of features present in a macro block comprising said given pixel wherein the features are related to skin, texture and luminance level.

In a even yet further embodiment, the method further comprises the step of determining the presence of the texture feature by parting the macro block into elementary blocks, determining for each elementary block a mean square error, determining the minimum among the determined mean square errors and comparing the minimum with a threshold.

In another even yet further embodiment, the method further comprises the step of determining the presence of the luminance feature by determining an averaged luminance value of the macro block, comparing the averaged luminance value with a lower threshold and/or comparing the averaged luminance value with an upper threshold.

Advantageous additional embodiments of the invention comprise the features of the respective dependent claims.

Exemplary embodiments of the invention are explained in more detail in the following description.

EXEMPLARY EMBODIMENTS

JPEG2000 is a very popular image and/or video coding standard yielding significant compression rates by help of a discrete wavelet transformation (DWT). Moreover, JPEG2000 supports various functions like lossless encoding, lossy or compressed encoding, error resilient encoding or region of interest (ROI) encoding in one single coding stream.

The key algorithms of JPEG2000 comprise Embedded Block Coding with Optimized Truncation (EBCOT) and arithmetic encoding (MQ).

In a typical JPEG2000 coding scheme, first the input image is divided into square regions, called tiles. Each tile can be coded independently. Then, a 2-dimensional DWT decomposes a tile into LL, LH, HL, and HH subbands. LL subband is a low resolution version of the original tile and again decomposed into four subbands recursively. After the wavelet transform and quantization, coefficients in each subband are divided into several non-overlapping code blocks of a size of typically of 32×32 or 64×64 coefficients, which will be processed independently by EBCOT and MQ algorithms.

EBCOT comprises two parts, Tier-1 and Tier-2 coding. Tier-1 utilizes the context-based arithmetic coder to encode each code-block into an independent embedded bit-stream. Each code block is encoded bitplane by bitplane from the most significant bit (MSB) towards the least significant bit (LSB). Tier-2 optimizes the rate control by minimizing the image distortion for a given bit rate. Tier-2 further forms the packets of the final stream. JPEG2000 provides an accurate rate control by means of the rate distortion optimization algorithm which enables determination of an optimized truncation bit plane for a given bit rate. The rate-distortion optimization algorithm is also known as post compression rate distortion (PCRD) optimization algorithm.

MQ, arithmetic coding is used in the last part of the encoding process. The coding is done using context dependent binary arithmetic coding. The recursive probability interval subdivision of Elias coding is the basis for the binary arithmetic coding process. With each binary decision, the current probability interval is subdivided into two sub-intervals, and the code stream is modified, if necessary, so that it points to the base—the lower bound—of the probability sub-interval assigned to the symbol.

In JPEG2000, compression is achieved by encoding a certain number of bit planes. EBCOT is adopted for a precise control of such kind of compression. It is achieved by truncation with Weighted Mean Square Error (WMSE). WMSE calculates a weighted distortion from a component weight w_cmpt, a band weight w_band, a quantization step weight w_step and a bit plane weight w_bitpos. Calculation of WMSE as known from JPEG2000 is illustrated as Eqn. 1:

$$D_i = WMSE_i = \sum_{k=1}^{N_i} (d_k \times w\_cmpt \times w\_band \times w\_step \times w\_bitpos) \quad (1)$$

$$(i = 1, 2, \ldots, N_{cb})$$

wherein $D_i$ is the weighted mean distortion of the i-th code block and $d_k$ is the distortion or error of the k-th coefficient if truncation is performed at the current bit plane. $N_{CB}$ is the number of code-blocks in the subband comprising also said i-th code block and $N_i$ is the number of components or coefficients in said i-th code block. The band weight $w\_band_{LL}$ for the LL subband is larger than the band weight $w\_band_{LH}$ for the LH subband. The LH-band weight $w\_band_{LH}$ equals the HL-band weight $w\_band_{HL}$ which is larger than the HH-band weight $w\_band_{HH}$. The bit plane weight w_bitpos is normally calculated from a bit plane position bitpos as $4^{bitpos}$.

Human eyes are more sensitive to some regions, such as faces, flat areas, and the region with middle tone. Any artefact in these regions is detrimental to the subjectively perceived quality. Such a region is called Perceptually Important Region (PIR). On contrary, humans often ignore compression errors in dark areas or textured blocks which are called Perceptually Unimportant Regions (PUR). That is, a PUR can hide more artifacts introduced by compression than a PIR.

Therefore, bits can be moved from PUR to PIR, which improves the overall visual quality while keeping the overall bit rate constant.

In an exemplary embodiment, three features, skin tone, spatial activity—also known as texture—and luminance level are detected to determine the PURs and the PIRs of an image. All these visual features are fused for generating a uniform feature map, which contains quantization parameter offsets for each macro block. These quantization parameter offsets are the perceptual cues for distinguishing PIRs from PURs. And the value of a given quantization parameter offset indicates the perceptual importance of a corresponding macro block.

A feature map generation software is used which generates a set of quantization parameter offsets $QP\_offset_j$, j=1, ..., $N_{MB}$, comprising one quantization parameter offset per macro block wherein $N_{MB}$ is the number of macro blocks in the image. The quantization parameter offset $QP\_offset_j$ indicates the perceptual importance of the j-th macro block. The lower the quantization parameter offset $QP\_offset_j$ is, the higher is the perceptual importance of the j-th macro block.

The skin region in the image, if any, may be detected using a method of colour segmentation such as the one proposed by D. Cai and K. N. Ngan in the document entitled "Face segmentation using skin color map in videophone applications" published in IEEE transactions on CSVT in 1999.

For measuring the spatial activity, variance may be used. The spatial activity is calculated from the four luminance frame-organized elementary blocks, using the original pixel values:

$$sp\_act_j = 1 + \min(vbkl_1, vbkl_2, vbkl_3, vbkl_4) \quad (2)$$

wherein $$vbkl_m = \frac{1}{64} \sum_{i=1}^{64} (P_i^m - \bar{P}_m)^2 \quad (3)$$

and $$\bar{P}_m = \frac{1}{64} \sum_{i=1}^{64} P_i^m \quad (4)$$

with $P_k^n$ being the k-th sample value in the n-th original macro block.

If $sp\_act_j$ is smaller than a give threshold THT, the block is determined as a flat region. THT can be 8 in an exemplary application.

Visual accuracy is higher in the mid-tones. To utilize this feature, two thresholds THL and THH are defined. Then, the macro blocks are classified into one out of three categories by help of their luminance level luma:

$$level = \begin{cases} 0, & 0 \leq luma < THL \\ 1, & THL \leq luma \leq THH \\ 2, & THH < luma \leq 255 \end{cases} \quad (5)$$

The regions with level 1 are defined as the important areas.

Then, the obtained three features may be combined to adjust the quantization step. The lowest QP offset is assigned to the regions which contain all the three features. Somewhat higher QP offsets are assigned to the regions with two or one features. And, relatively high QP offsets are assigned to remaining regions to compensate the increased bits. For the simplification purpose, we just set these three features with the same priority of the sensitivity. Therefore, corresponding weights $W_j$ for macro block $j=1, \ldots, N_{MB}$ are represented as $$W_j = \begin{cases} 3, & \text{block conatins all of the 3 features} \\ 2, & \text{block contains 2 features} \\ 1, & \text{block contains 1 feature} \\ -2, & \text{block contains no feature} \end{cases} \quad (6)$$

Then, the QP offsets $QP\_offset_j$ for macro block $j=1, \ldots, N_{MB}$ are determined based on the weights $W_j$:

$$QP\_offset_j = -W_j \cdot QPStep \quad (7)$$

QPStep is the step size of the QP offset $QP\_offset_j$. It is used to control the magnitude of QP offset $QP\_offset_j$. Exemplarily, QPStep can be set to 2 in the applications.

The QP_offset, are used to calculate additional feature weights $w\_feature_k$ being dependent on the k-th code block with $k=1, \ldots, N_{CB}$. Then, the WMSE calculation of Eqn. (1) is further weighted by the additional feature weights $w\_feature_k$.

An average quantization parameter offset QP_offset_img over the whole image and a set of average quantization parameter offset $QP\_offset\_cb_i$, $i=1, \ldots, N_{CB}$, comprising one average quantization parameter offset per code block, are calculated according to Eqn. (8) and Eqn. (9):

$$QP\_offset\_img = \frac{1}{N_{mb}} \sum_{i=1}^{N_{mb}} QP\_offset_i \quad (8)$$

$$QP\_offset\_cb_i = \frac{1}{N_{fm,i}} \sum_{i=1}^{N_{fm}} QP\_offset_i \ (i=1, 2 \ldots, N_{cb}) \quad (9)$$

wherein $N_{fm,i}$ represents the number of macro blocks which correspond to the i-th code-block. For example, if a code-block's size is set to 32×32, one code-block corresponds to an 64×64 block in the original image and said 64×64 block comprises 16 macro blocks. Then, $N_{fm,i}$ is equal to 16. Furthermore, a maximum QP_offset_max in the set of average quantization parameter offset $QP\_offset\_cb_i$, $i=1, \ldots, N_{CB}$, is determined.

By help of the QP_offset_max, QP_offset_img and QP_offset_cb, a set of feature bit values $feature\_bits_i$, $i=1, \ldots, N_{CB}$, comprising one feature bit value per code block, is determined:

$$feature\_bits_i = \frac{(QP\_offset\_cb_i - QP\_offset\_img)}{QP\_offset\_max - QP\_offset\_img} \times range \quad (10)$$

$$(i = 1, 2 \ldots, N_{cb})$$

Finally, the additional feature weights $w\_feature_k$ are calculated using a similar method as for calculating w_bitpos. That is, the additional feature weights $w\_feature_k$ are calculated as:

$$w\_feature_k = 4^{feature\_bits} \quad (11)$$

Then, a further weighted mean square error calculation $\tilde{D}_i$ takes the feature weights into account as follows:

$$\tilde{D}_i = w\_feature_i \times D_i (i=1, 2, \ldots, N_{cb}) \quad (12)$$

The further weighted mean square error calculation $\tilde{D}_i$ is used in an adapted EBCOT for controlling quantization by controlling truncation. Doing so, the perceptual importance of code blocks is taken into account within the process of achieving compression by truncating encoding at a truncation bit plane.

The workflow of an exemplary embodiment of the proposed method is illustrated as follows:

```
for each DWT Resolution Level RL do
    for each Component C do
        for each Subband S of C, RL do
            for each Code Block CB of S, C, RL do
                Calculate feature_bits according to Eqn. 10;
                Calculate w_feature according to Eqn. 11;
                Encode Codeblock of CB, S, C, RL with D̃
                  according to Eqn. 12.
            endfor
        endfor
    endfor
endfor
```

As pointed out above, a code block comprises several macro blocks. The QP_offset_cb$_i$ of code block i is the average of the offsets of the macro blocks comprised in the code block i.

In a further exemplary embodiment, a code block is therefore decomposed into sub blocks wherein each sub block in DWT domain is corresponding to a macro block in the original image. Thus, a sub block also corresponds to an individual perceptual weight in the feature map and the number of sub blocks in the i-th code block is $N_{fm,i}$.

Then, PIRs and PURs can be distinguished inside a code-block and the WMSE calculation may be further adapted as:

$$\tilde{D}'_i = \sum_{j=1}^{N^i_{SB}} w\_feat_{ij} \sum_{k=1}^{n_{ji}} (d_k \times w\_cmpt \times w\_band \times w\_step \times w\_bitpos) \quad (13)$$

$$(i = 1, 2, \ldots, N_{cb})$$

wherein $N^i_{SB}$ is the number of sub-blocks in the i-th code block and $n_j$ is the number of coefficients in the j-th sub-block.

Parameter $w\_feat_{ij}$ is determined as:

$$w\_feat_{ij} = \frac{4^{feat\_bits_{i,j}}}{N_{fm,i}} \quad (14)$$

wherein $$feat\_bits_{ij} = \frac{(QP\_offset\_sb_{i,j} - QP\_offset\_img)}{QP\_offset\_max - QP\_offset\_img} \times range \quad (15)$$

$$(j = 1, 2 \ldots, N^i_{SB})$$

$QP\_offset\_sb_{i,j}$ is the QP-offset determined for the macroblock to which the j-th sub-block in the i-th code block corresponds.

Independent from such further adaptation of the WMSE-calculation, coding bits can be shifted inside the code block from PURs to PIRs in order to enhance the overall visual quality of image aspects encoded in the code block while keeping the bit rate constant.

That is, DWT coefficients in PIRs are encoded with more bit planes while DWT coefficients in PURs are encoded with correspondingly less bit planes. This is done such that the overall number of bits used for encoding the code block remains constant.

For a given optimized truncation bit plane TBO$_i$ indicating the number of bit planes to-be-encoded for achieving a certain compression ratio of code block i, an individual truncation bit plane variation TB$_{ij}$ for sub block j is determined according the following equation:

$$TB_{ij} = \frac{QP\_offset\_sb^i_j - QP\_offset\_cb_i}{QP\_offset\_max_i - QP\_offset\_cb_i} \cdot TB\_range \quad (16)$$

wherein $QP\_offset\_max_i$ is the maximum among the QP offsets of the macro blocks contributing to code block i. TB_range is the range for bit plane tuning. Exemplarily, TB_range is set to 2.

If TB$_{ij}$ is smaller than 0, encoding of the corresponding sub block j is truncated at a bit plane less significant than the given optimized truncation bit plane for the code block i. And if TB$_{ij}$ is greater than 0, encoding of the corresponding sub block j is truncated at a bit plane more significant than the given optimized truncation bit plane for the code block i.

The optimized truncation bit plane for the entire code block cannot be calculated in advance but is determined during encoding. Therefore, encoding of each code block has to be performed twice. In a first pass, the code block is encoded, either according to normal JPEG2000 encoding or while taking the perceptual importance of the code block into account. This results in the optimized truncation bit plane. In a second pass, the individual truncation bit planes for the sub blocks are determined by help of the overall optimized truncation bit plane and the individual truncation bit plane variations. Then, the code block is re-encoded with varying individual truncation bit planes for the sub blocks.

The workflow of another exemplary embodiment of the proposed method is illustrated as follows:

```
for each DWT Resolution Level RL do
    for each Component C do
        for each Subband S of C, RL do
            for each Code Block CB of S, C, RL do
                Calculate feature_bits according to Eqn. 10;
                Calculate w_feature according to Eqn. 11;
                Determine TBO with D according to Eqn. 1, D̃
                according to Eqn. 12 or D̃' according to Eqn.
                13;
                for each subblock sb of CB of S, C, RL do
                    Calculate TB according to Eqn. 16;
                endfor
                Re-encode Codeblock of CB, S, C, RL with TBO
                and TB;
            endfor
        endfor
    endfor
endfor
```

The invention claimed is:

1. A method for compressing an image, the method comprising
    associating perceptual importance parameters with pixels of the image,
    applying a transform on the image,
    partitioning the transformed image into code blocks and partitioning a given code block into sub-blocks,
    using an average of the perceptual importance parameters of the pixels, to which the coefficients of the given code block correspond, for determining a preliminary truncation bit plane for said given code block,
    encoding coefficient bits of said given code block together from a most significant bit plane towards a least significant bit plane, wherein
    encoding of coefficient bits is truncated individually at sub-block dependent truncation bit planes, each of said sub-block dependent truncation bit planes being dependent on the perceptual importance parameters associated with pixels to which the coefficients of the respective sub-block correspond, wherein
    the encoding of coefficients of at least one sub-block is truncated at an advanced truncation bit plane and encoding of coefficients comprised in at least another sub-block is truncated at a reduced truncation bit plane wherein an average truncation bit plane of the sub-blocks corresponds to said preliminary truncation bit plane.

2. The method according to claim 1, wherein
coefficients which are comprised in the same sub-block are associated with the same perceptual importance parameter and
the at least one sub-block's coefficients are associated with a perceptual importance parameter indicating smaller perceptual importance than the code block parameter and
the at least another sub-block's coefficients are associated with a perceptual importance parameter indicating greater perceptual importance than the code block parameter.

3. The method according to claim 2, further comprising the steps of
determining truncation bit plane variation parameters for the sub-blocks wherein
said truncation bit plane variation parameters depend on the perceptual importance parameter associated with the respective sub-block, the code block parameter and/or a maximum perceptual importance parameter within said given block.

4. The method according to claim 1, wherein determining the average truncation bit plane comprises
further weighting a weighted mean distortion calculation over said given code block's coefficients by a feature weight associated with said given code block and
determining the average truncation bit plane based on the further weighted mean distortion calculation.

5. The method according to claim 4, wherein
said feature weight associated with said given code block further depends on an average perceptual importance parameter and/or a maximum among the code block parameters.

6. The method according to claim 1, wherein
the perceptual importance parameters are quantization parameter offsets.

7. The method according to claim 6, further comprising the step of,
for a given pixel, determining the quantization parameter offset based on a quantization parameter offset step size and/or based on an indication of the number of features present in a macro block comprising said given pixel wherein
the features are related to skin, texture and luminance level.

8. The method according to claim 7, further comprising the step of determining the presence of the texture feature by
parting the given code block into elementary blocks,
determining for each elementary block a mean square error,
determining the minimum among the determined mean square errors and
comparing the minimum with a threshold.

9. The method according to claim 7, further comprising the step of determining the presence of the luminance feature by
determining an averaged luminance value of the macro block,
comparing the averaged luminance value with a lower threshold and/or
comparing the averaged luminance value with an upper threshold.

10. The method according to claim 8, further comprising the step of determining the presence of the luminance feature by
determining an averaged luminance value of the macro block,
comparing the averaged luminance value with a lower threshold and/or
comparing the averaged luminance value with an upper threshold.

11. A device for compressing an image, the device comprising
means for associating perceptual importance parameters with pixels of the image,
means for transforming the image,
means for partitioning the transformed image into code blocks and partitioning a given code block into sub-blocks,
means for using an average of the perceptual importance parameters of the pixels, to which the coefficients of the given code block correspond, for determining a preliminary truncation bit plane for said given code block,
encoding coefficient bits of said given code block together from a most significant bit plane towards a least significant bit plane, wherein
means for encoding of coefficient bits is truncated individually at sub-block dependent truncation bit planes, each of said sub-block dependent truncation bit planes being dependent on the perceptual importance parameters associated with pixels to which the coefficients of the respective sub-block correspond, wherein
said means for encoding being adapted such that the encoding of coefficients of at least one sub-block is truncated at an advanced truncation bit plane and encoding of coefficients comprised in at least another sub-block is truncated at a reduced truncation bit plane wherein an average truncation bit plane of the sub-blocks corresponds to said preliminary truncation bit plane.

* * * * *